United States Patent
Bishoyi et al.

(10) Patent No.: US 12,354,148 B1
(45) Date of Patent: Jul. 8, 2025

(54) RECOMMENDATION ENGINE AND PROCESS

(71) Applicant: NATIONWIDE MUTUAL INSURANCE COMPANY, Columbus, OH (US)

(72) Inventors: Abhishek Bishoyi, Columbus, OH (US); Chris Cargill, Westerville, OH (US); Ashley Carpenter, Westerville, OH (US); Kevin A. Timm, Waukee, IA (US)

(73) Assignee: Nationwide Mutual Insurance Company, Columbus, OH (US)

( * ) Notice: Subject to any disclaimer, the term of this patent is extended or adjusted under 35 U.S.C. 154(b) by 565 days.

(21) Appl. No.: 17/545,016

(22) Filed: Dec. 8, 2021

(51) Int. Cl.
| | |
|---|---|
| *G06Q 30/00* | (2023.01) |
| *G06F 3/0482* | (2013.01) |
| *G06F 3/04845* | (2022.01) |
| *G06Q 30/0601* | (2023.01) |

(52) U.S. Cl.
CPC ....... *G06Q 30/0631* (2013.01); *G06F 3/0482* (2013.01); *G06F 3/04845* (2013.01); *G06Q 30/0641* (2013.01)

(58) Field of Classification Search
None
See application file for complete search history.

(56) References Cited

U.S. PATENT DOCUMENTS

| | | | | |
|---|---|---|---|---|
| 7,788,137 B1 * | 8/2010 | Tifford | ................ | G06Q 40/123 |
| | | | | 705/26.1 |
| 10,453,144 B1 * | 10/2019 | McRae | ................ | G06N 20/10 |
| 2008/0154651 A1 * | 6/2008 | Kenefick | ................ | G06Q 40/08 |
| | | | | 705/4 |
| 2015/0379596 A1 * | 12/2015 | Li | ................ | G06Q 10/083 |
| | | | | 705/26.2 |
| 2017/0039633 A1 * | 2/2017 | Yenisetty | ................ | G06Q 30/08 |
| 2018/0005293 A1 * | 1/2018 | Adams | ................ | G06Q 30/0625 |
| 2020/0097981 A1 * | 3/2020 | Teo | ................ | H04M 3/5183 |
| 2020/0111171 A1 * | 4/2020 | Chopra | ................ | G06Q 40/02 |
| 2020/0380540 A1 * | 12/2020 | Fox | ................ | G06F 17/16 |
| 2021/0125098 A1 * | 4/2021 | Peran | ................ | G06N 20/20 |
| 2021/0390573 A1 * | 12/2021 | Reedy | ................ | G06Q 30/0261 |

(Continued)

OTHER PUBLICATIONS

Microsoft Learn; Many models machine learning (ML) at scale in Azure with Spark; Nov. 23, 2021; Microsoft (Year: 2021).*

*Primary Examiner* — Anand Loharikar
*Assistant Examiner* — Norman Donald Sutch, Jr.
(74) *Attorney, Agent, or Firm* — Thomas E. Lees, LLC

(57) ABSTRACT

A process for recommending items comprises receiving a first input from a user via a user interface and modifying the user interface based on the first input. A second input is received from the user via the user interface. The first and second inputs are used as data for running a set of primary models and a set of secondary models, where each item that the process may recommend corresponds to one and only one primary model and one and only one secondary model. The primary models calculate a confidence level that the user should be recommended the item associated with the primary model, based on the first and second inputs. Items associated with primary models where the confidence level is above a threshold are recommended to the user. For each recommended item, a parameter is generated by the associated secondary model.

7 Claims, 5 Drawing Sheets

(56) References Cited

U.S. PATENT DOCUMENTS

2023/0153844 A1\* 5/2023 Jari ...................... G06Q 10/067
  705/7.31
2023/0260003 A1\* 8/2023 Guo ................... G06Q 30/0631
  705/26.1

\* cited by examiner

RECOMMENDATION ENGINE AND PROCESS

BACKGROUND

Various aspects of the present invention relate generally to recommender systems and specifically to model-based recommender systems.

Recommender systems predict how a user would react to a specific item. They act as filters to give users less options when making a decision so the user is not overwhelmed or is not presented items that the user would not normally be interested in.

BRIEF SUMMARY

According to aspects of the present invention, a process for recommending items comprises receiving a first input from a user via a user interface and modifying the user interface based on the first input. A second input is received from the user via the user interface. The first and second inputs are used as data for running a set of primary models and a set of secondary models, where each item that the process may recommend corresponds to one and only one primary model and one and only one secondary model. The primary models calculate a confidence level that the user should be recommended the item associated with the primary model, based on the first and second inputs. Items associated with primary models where the confidence level is above a threshold are recommended to the user. For each recommended item, a parameter is generated by the associated secondary model.

DETAILED DESCRIPTION

According to aspects of the present disclosure, embodiments of systems and processes for recommending items to a user is disclosed. The user enters information about the user through a user interface (e.g., running on a client computer), and the information is sent to a set of primary models and a set of secondary models. In some embodiments, there is a number of secondary models equal to a number of primary models, and there is a one-to-one relationship between the secondary models and the primary models (i.e., one of the secondary models corresponds to one and only one of the primary models). Further, each of the primary models corresponds to an item that may be recommended and are used to determine whether to recommend the item based on the information received from the user. The secondary models output a parameter associated with the item (associated with the corresponding primary model) and based on the information received from the user.

The primary and secondary models are trained using real-world user information gathered from the users of the system. For example, when an item is presented to a user, the user's reaction (picking or not picking that item) is fed back to the system to help train the models. Thus, not only do the primary models include recommending an item, but they include a confidence score on whether the recommended item is good. If the confidence score surpasses a threshold for that model, then the item is recommended.

Using two models dedicated to each possible item recommendation (one for recommendation and one for another parameter of that item (e.g., cost)) allows for an extremely quick response time to inquiries in a space that has a limited number of items available, as opposed to other solutions that require that a model be used for multiple items or that one model outputs both the recommendation and the parameter. Thus, aspects of the present disclosure are directed toward a technological improvement in the space of recommendation engines.

Networking Overview

Figure 1:
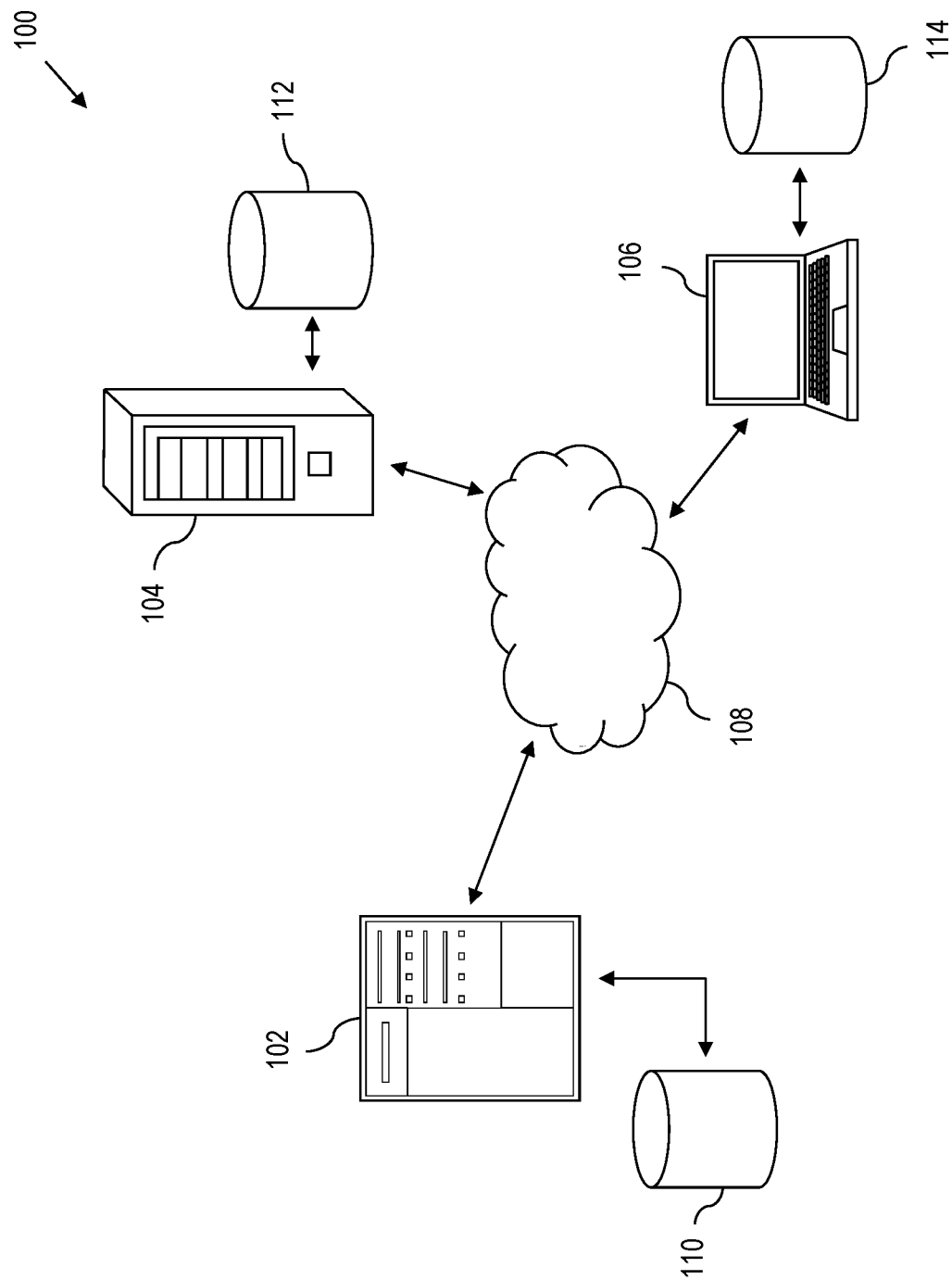
FIG. 1 is a block diagram illustrating a networking system, according to various aspects of the present disclosure.

Referring to drawings and in particular FIG. 1, a network system 100 is illustrated according to aspects of the present disclosure herein. Generally, a processing device designated as a first machine 102 communicates with one or more remote processing devices, e.g., a second machine 104 and a third machine 106, across a network 108. The second machine 104 and third machine 106 are illustrated solely for purposes of simplified explanation. In practice, one or more remote devices may communicate with the first machine 102. The first machine 102 may comprise a mainframe computer, server computer, or other processing device that is capable of responding to data transfer requests, as will be described in greater detail herein. In this regard, the first machine 102 has access to storage 110, e.g., any form of storage, including disk(s), network addressed storage (NAS), file server(s), a cloud-based storage or other structure where data can be retrieved.

The second machine 104 and third machine 106 may each comprise any processing device that is capable of communicating over the network 108 to request and/or receive data from the first machine 102. For instance, typical processing devices include server computers, personal computers, notebook computers, and tablets. The second machine 104 or third machine 106 may also comprise by way of example, transactional systems, purpose-driven appliances, cellular devices including smart telephones, and special purpose computing devices.

For purposes of discussion herein, the second machine 104 has access to storage 112 where data received from the first machine 102 is to be stored. Likewise, the third machine 106 has access to storage 114 where data received from the first machine 102 is to be stored.

The network 108 provides communication links between the various processing devices, e.g., the first machine 102, the second machine 104, and the third machine 106. Accordingly, the network 108 may be supported by networking components such as routers, switches, hubs, firewalls, network interfaces, wired or wireless communication links and corresponding interconnections, cellular stations and corresponding cellular conversion technologies, e.g., to convert between cellular and TCP/IP, etc. Such devices are not shown for purposes of clarity. Moreover, the network 108 may comprise connections using one or more intranets, extranets, local area networks (LAN), wide area networks (WAN), wireless networks (WIFI), the Internet, including the world wide web, a cloud, and/or other arrangements for enabling communication between the processing devices, in either real time or otherwise, e.g., via time shifting, batch processing, etc.

The network system 100 is shown by way of illustration, and not by way of limitation, as a computing environment in which various aspects of the present disclosure may be practiced. Other configurations may alternatively be implemented. All of the devices discussed above in reference to the network (e.g., machines, routers, switches, hubs, etc.) are entities within the network.

Process for Recommending Items

Figure 2:
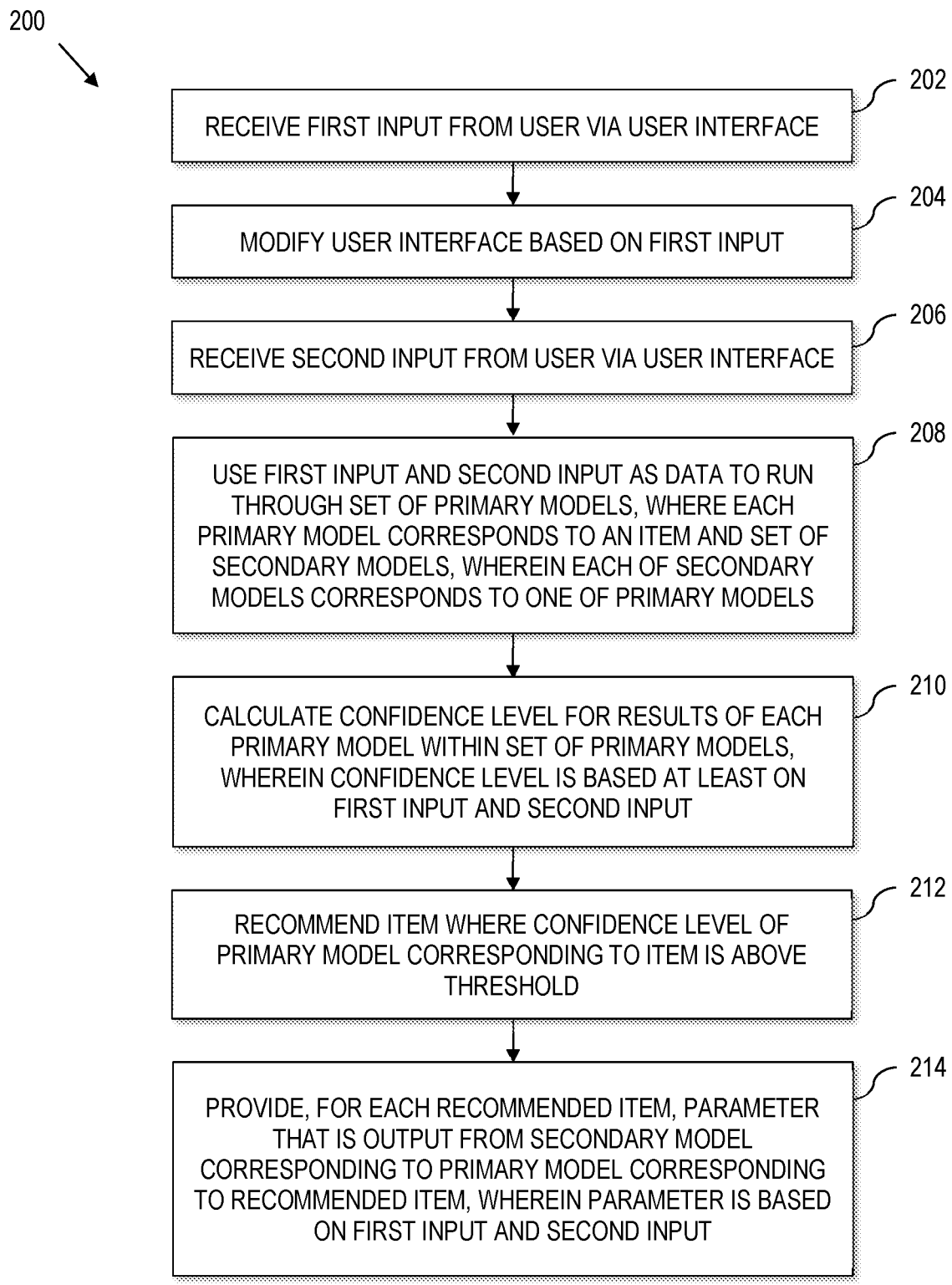
FIG. 2 is a flow chart illustrating a process for recommending items to a user, according to various aspects of the present disclosure.

FIG. 2 is a flow chart illustrating a process 200 for recommending a items to a user. Embodiments of the process 200 may be performed on computing devices described herein (e.g., device(s) 102, 104, 106, FIG. 1).

At 202, a first input is received from a user via a user interface. For example, a device that is remote from the device running the process may display a user interface to a user (e.g., a web browser on a user's computer may display questions/prompts and places for the user to answer those questions via a user interface). The user interface may be displayed via a generic program (e.g., a web browser), a specific software application (e.g., an app downloaded to the device), etc. The user would be presented with at least one question or prompt to supply information via the user interface. For example, the user may be prompted to supply a business-type they run (e.g., restaurant, retail store, delivery service, etc.), a location of the business, number of employees, gross revenue, etc. Then, the user enters a response(s) to the prompt(s) via the user interface, which are received as a first input from the user.

Based on the received first input, the user interface is modified at 204. In some embodiments, the prompts may change (e.g., when the user hits a button, automatically, etc.) based on the information received. For example, if the user enters information that they run a restaurant, then the user interface may change the prompt to ask whether they have more than one location. Then at 206, a second input is received via the user interface. As above, the second input is in response to questions or prompts presented to the user (after the first input has been received). While only two inputs are discussed here, a number of inputs greater than two may be used.

At 208, the first input and the second input are used as data to run through two sets of models: a set of primary models and a set of secondary models. Each of the items that may be presented to the user is associated with two models: a primary model (of the set of primary models) and a secondary model (of the set of secondary models). Further, each individual primary model corresponds to only one item, and each secondary model corresponds to only one primary model/item. Therefore, there is a 1:1:1 relationship between items, primary models, and secondary models. For example, if twelve items are in a pool of available items, there will also be twelve primary models in the set of primary models and twelve secondary models in the set of secondary models.

The primary models are recommendation engines that use the first input and the second input to determine how to recommend items to the user. The primary model is associated with calculating a score to determine whether to recommend the item associated with the primary model. The secondary model is associated with determining a parameter for the associated item. For example, a recommendation system has an item that is a service level agreement. Based on the first input and the second input, the first model can calculate that there is a 78% chance that the user would want the service level agreement in general, and the second model would indicate that an uptime for the service as part of the service level agreement is in a range of 99.5% or greater. As another example, in a system that includes vehicle insurance as an item, based on the first input and the second input, the first model can calculate that there is an 83% chance that the user would want the vehicle insurance in general, and the second model would indicate that a monthly premium for the vehicle insurance is in a range of $150-$234. As another example, the confidence level can be associated with how many other users that have similar answers to the current user have purchased the item when recommended to them. The calculations of the first models and the second models is discussed in greater detail below.

Because the models are separated into one primary model and one secondary model for each item, the models can all run in parallel, which results in a faster response time than previous solutions. For example, all of the primary models can run in parallel with each other. As another example, all of the secondary models can run in parallel with each other. As a yet another example, all of the primary models and the secondary models can run in parallel with each other.

At 210, the primary models calculate a confidence level (as mentioned above) based on the first input and the second input. Thus, each model calculates a confidence level that the user may be interested in the item associated with the primary model.

At 212, the calculated confidence levels are compared to a threshold, and the corresponding item is recommended to the user if the item's associated confidence level is above a threshold. For example, a list of items where an output value of the primary model corresponding to the item is above the predetermined threshold may be presented to the user. In some embodiments, the threshold is the same value for each primary model. In other embodiments, each model has its own value for the threshold. For example, three primary models can have a threshold of 85% and two other primary models can have a threshold of 90%.

Further, the presented list of recommended items may also include a filter that limits a number of recommended items. For example, the list may be limited to two items for recommendation regardless of how many items include a confidence level above the threshold. The filter can work in any applicable way. For example, if there are five items that have confidence levels above the threshold and the list is limited to two items, then the two items that have the highest confidence level may be shown. As another example, if there are five items that have confidence levels above the threshold and the list is limited to two items, then the two items above the threshold that have the highest deviation between the confidence level and the associated threshold may be shown. Other methods of filtering may also be used.

At 214, each recommended item is provided a parameter that is output from the secondary model associated with the item. As discussed above, the parameter is based on the first input and the second input received from the user and may be a range of values. For example, if a parameter is a cost range (e.g., a monthly premium), then the cost range is shown to the user.

In some embodiments, the parameter from the secondary model may also be an input into the first model, which will determine a confidence level based on the first input, the second input, and the parameter. Further, if the secondary model produces several ranges (i.e., a set of ranges), then those can be fed into the first model such that the first model calculates a set of confidence levels. Thus, each range has a corresponding confidence level. Then, the range that is selected to be presented to the user (when the item is presented to the user) is the range associated with the confidence level that is closest to the threshold while still being above the threshold.

The recommended items along with the parameters are presented to the user for the user to select one (or more) of the selected items. If an item selection is receive (e.g., via the user interface), then the selected item is generated using the parameter(s) associated with that item.

In some embodiments, the process will periodically use the first input and the second input that was previously entered by the user to run through the process again without being prompted again by the user. As the models get updated through training, there may be different results based on new training data. Thus, even by using the same first input and the same second input by the user at a different time (unprompted by the user), the process may determine a different recommendation for the user and push such a recommendation to the user unprompted.

Example of an Embodiment of the Process 200 for Recommending Items

The following non-limiting example is provided to illustrate an embodiment of the process for recommending items. In this example, a recommendation system includes seven available items, so there are seven primary models and seven secondary models. The items are all able to be digitally created if the user selects any of them. Further, the models have all been trained using training data and updated using actual data from actual users.

The user accesses the user interface through a web browser and is presented with a prompt to enter a response about an activity characterizing the user's profession. In this example, the user enters information freeform into a response box. However, in other embodiments, the response may be chosen from choices in a pulldown box that lists several professions. The user chooses a profession of Restaurant. That choice is received as a first input from the user. The system uses a rules engine to determine that the next prompt to the user should look for the user to narrow down a detail of the restaurant. However, the rules engine is optimized to try to get the most amount of relevant information by asking the least amount of questions of the user. In this example, the user is presented with a prompt to indicate a type of restaurant by choosing between "Full-Service Restaurant" or "Drinking Places (e.g., Alcoholic Beverages)." The user responds by choosing Full-Service Restaurant.

The rules engine then gives prompts for a location (offering all 50 states in a dropdown box), how many years the restaurant has been in business, and an estimate of gross revenue for the next year. The user enters that the restaurant is in Ohio, has been in business for six years, and has a gross revenue of $750,000.

The rules engine then determines that prompts for the next few questions are desired, and sends them to the user interface: how many people are employees at the restaurant, estimate of payroll for next year, whether the restaurant owns any vehicles or buildings. The user responds with four people being employed, a payroll of $225,000, and that the business owns a vehicle but no buildings.

Based on the response that business owns a vehicle, the user is prompted with an inquiry of how many vehicles are owned and the average age of the vehicles. The user enters that the business owns one delivery vehicle that is six years old.

Now that the system has received several pieces of data, that data (or a subset of that data) is run through the seven primary models and the seven secondary models. In this example, all fourteen models (i.e., seven primary models and seven secondary models) run in parallel to give a quick response to the user.

As a result, six of the primary models return a confidence level below the threshold, so the items associated with those six primary models are not recommended to the user. However, the seventh primary model (associated with the item: "Commercial Auto Coverage") calculates a confidence level that is above the threshold. The system gets a parameter for the item associated with the seventh primary model from the secondary model. In this example, the parameter is a premium (i.e., monthly cost) range for the Commercial Auto Coverage, which is $51-$220 in this case. The item and the parameter are presented to the user via the user interface, along with a button for the user to gain more information, purchase/select the item, or both.

The models can be constantly trained (see description of FIG. 4 below), and as such the same data through the models may produce different results. In this example, it was determined that users similar to the current user did not require Flood Coverage. However, due to unforeseen circumstances over the next five years, more floods have been occurring in the user's territory, and other users similar to the current user have started getting flood coverage. With that change in circumstances and recent data run through the models, using the current user's first and second inputs three years later without the user having to prompt the process, the process may determine that an item to recommend the user would be Flood Coverage with a premium range as a parameter. Then the process can push a Flood Coverage recommendation to the user unprompted by the user years later.

This recommendation system and process can be employed by a user to determine if other users who are similar to the user have purchased the item, and with which parameters. Further, embodiments of the process 200 have the steps performed in a different order or in parallel. For example, the parameters can be determined using the secondary models before the confidence level is determined using the primary models, so the parameters may be used as data for the primary models to determine the confidence levels.

Topology for Recommendation System

Figure 3:
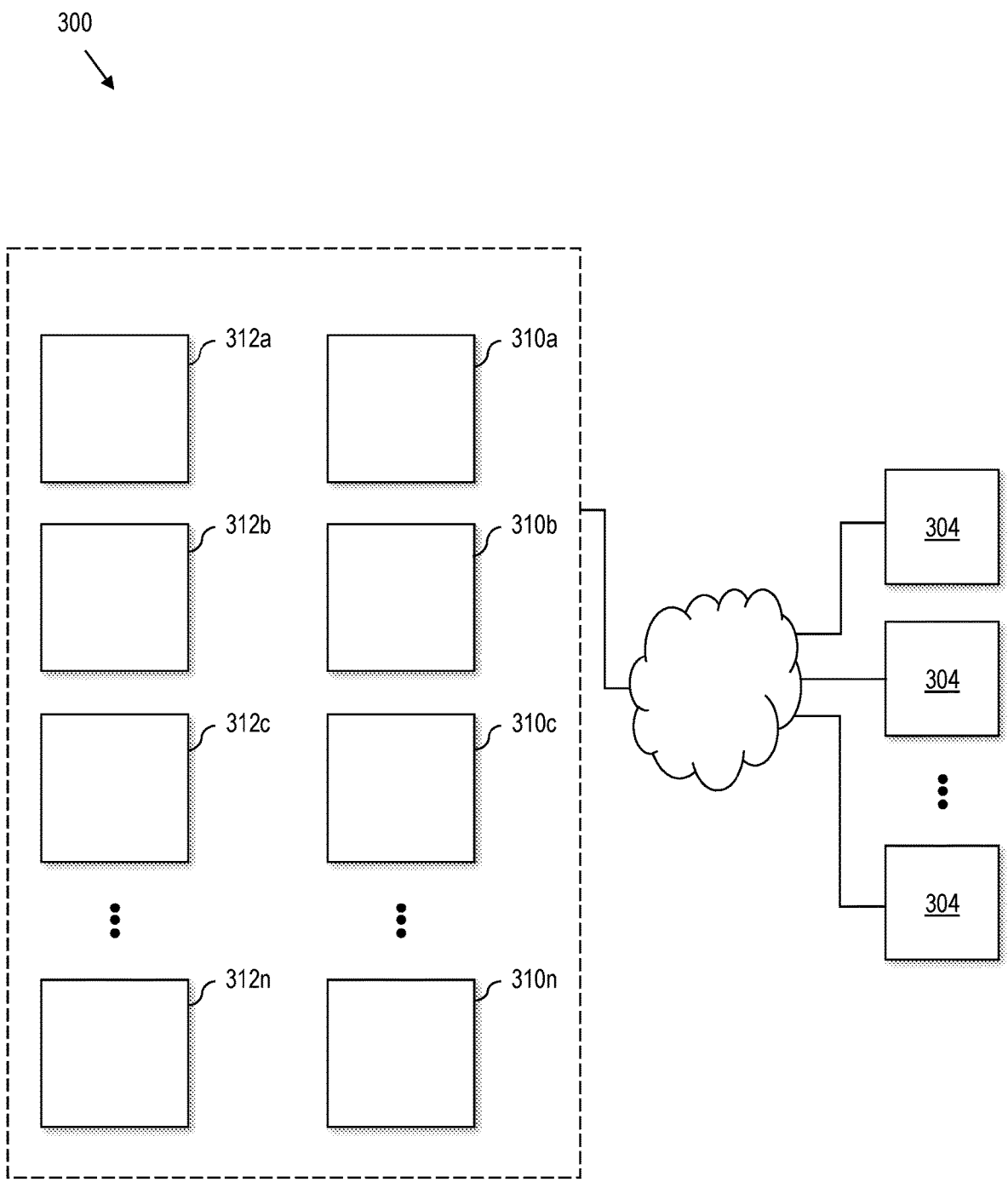
FIG. 3 is block diagram of a system for recommending items to a user, according to various aspects of the present disclosure.

FIG. 3 is a block diagram for a recommendation system 300 using two models for each item that may be recommended by the system 300. In many embodiments, the recommendation system 300 runs on a remote server 302 (e.g., 102 of FIG. 1) coupled to client devices 304 (e.g., 104, 106 of FIG. 1) via a network 308 (e.g., the Internet). The client device(s) 304 can run a user interface directly (e.g., if there is a specific app running on the client computers as well) or can run a web browser that can access the user interface running on the server 302 via the network 308.

For each item that the recommendation system 300 may recommend, there is a primary model 310a-n and a secondary model 312 a-n. As discussed above, the primary model determines a confidence value on whether the item associated with that primary model should be recommended to the user (compared to a threshold), and the secondary model determines a parameter associated with the item.

The models 310a-n, 312a-n are trained using real data gathered during other users' passes through the system.

Training the Models

Figure 4:
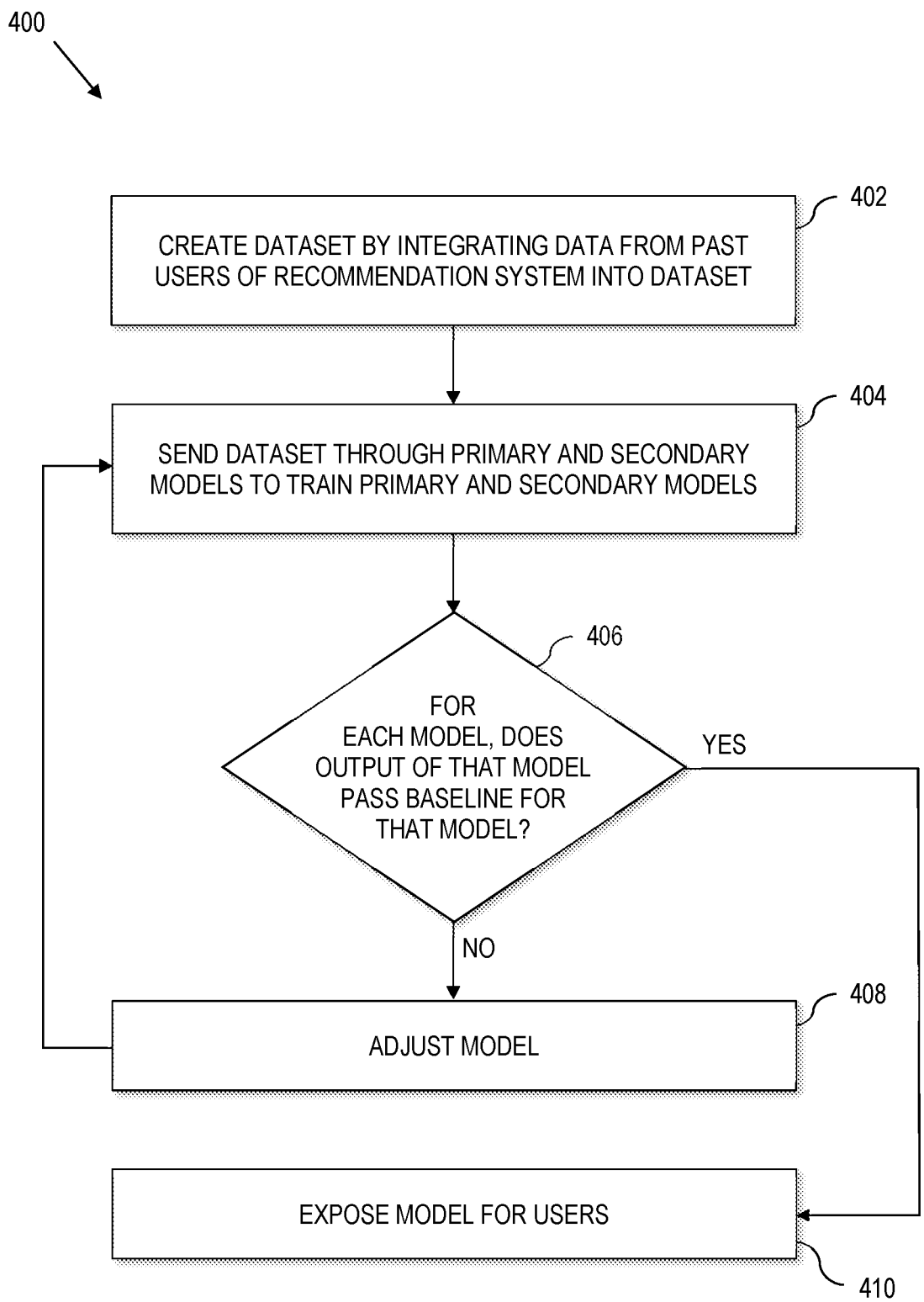
FIG. 4 is a flow chart illustrating a process for training primary and secondary models for the system to recommend items to the user, according to various aspects of the present disclosure.

FIG. 4 illustrates a process 400 for training the models. At 402, data from users using the recommendation system are integrated into a training dataset. The dataset includes both variables that users entered into the system and any of the recommendations chosen by the user. In some embodiments, when the multiples of the same items are presented to the user (where the items have a different parameter value/range), the dataset also includes the item and parameter selected by the user. Other data may be used as well.

At 404, the training dataset is sent to both primary and secondary models in the system. Those models then use the training data to tune the models to hopefully get the models to get desired results based on the variables and selected outcomes.

At 406, the models are evaluated against a baseline. For example, if the baseline for a particular primary model is 95% and that primary model is accurate 93% of the time, then that primary model is deemed to have failed a baseline test. In such situations, adjustments are made to the model at 408 and more training data is sent through the primary model. In subsequent pass(es), the same training dataset may be used, the training dataset may be augmented (adding/removing data from the dataset), the dataset may be replaced with a new training dataset, or combinations thereof. If the model passes the baseline, then the process proceeds to some postprocessing, where the model is made ready for access by users at 410. Each model may have its own baseline.

Thus, the models are trained using real world data as opposed to hypothetical data and predicted outcomes. Further, the models can be updated as desired. For example, the models can be trained and updated periodically (e.g., once a day, twice a day, once a month, etc.) or on the fly as new data comes in. Thus, there may be a training instance of a model and a use instance of the model, where the training instance is trained and not exposed to the user until it has passed the baseline. Once the model passes the baseline, the model is exposed for access (at 410).

Moreover, the baselines may be dynamic. For example, if a use instance of the model has a 78% accuracy rate, then the baseline for the training instance may be 78% or higher. Thus, any updated model should have a higher accuracy than a previous version of the model.

In other embodiments, times change (e.g., shutdowns requiring more people to get delivery food, so more restaurants own delivery vehicles), so it is good to train the models periodically (or continuously) to capture changes in environmental circumstances. Thus, the models can always be compared to their same baselines. Further, to reflect changing times, the training dataset may be augmented to remove older data (e.g., from before a certain event) to reflect the new circumstances.

Miscellaneous

Figure 5:
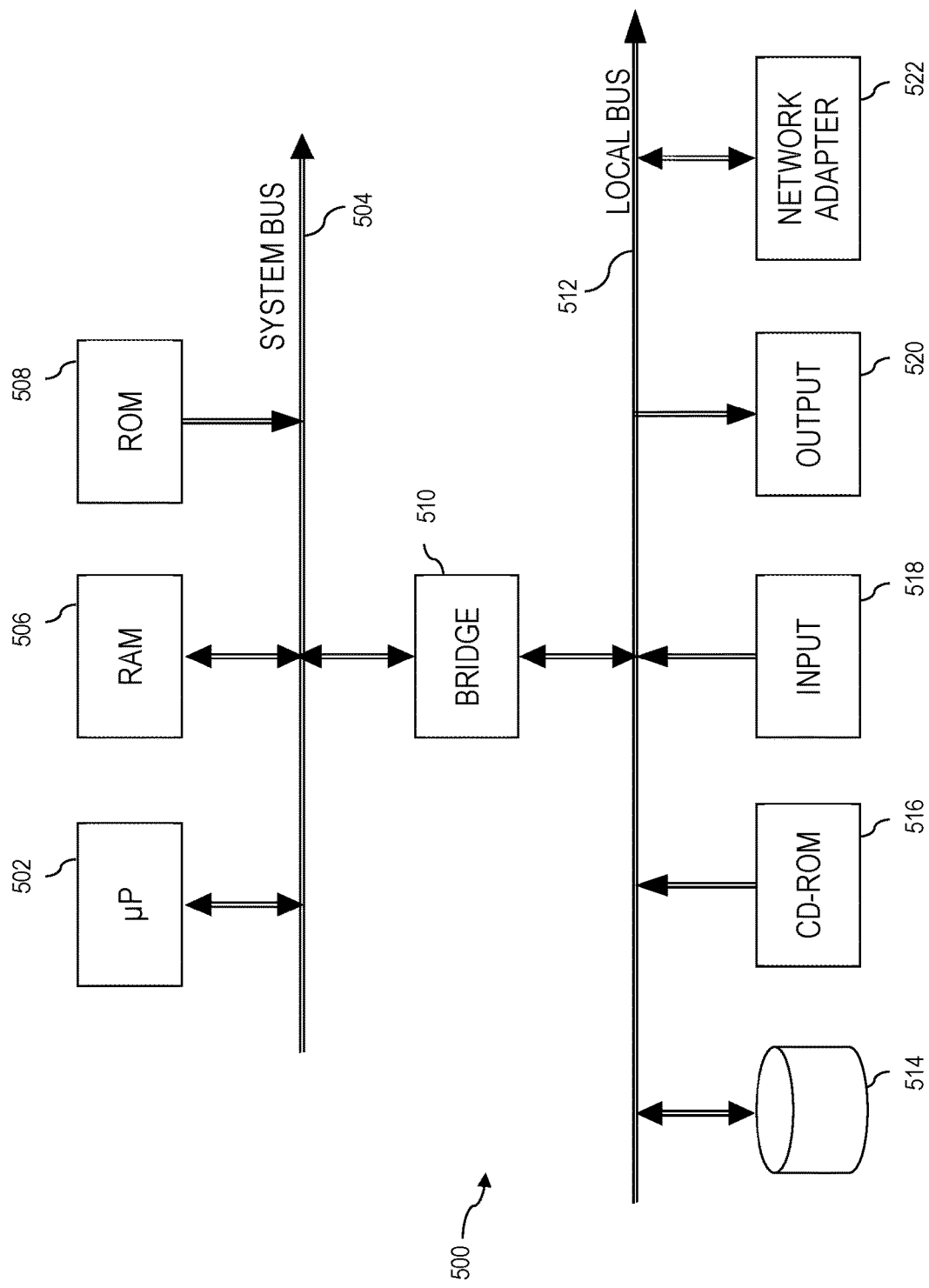
FIG. 5 is a block diagram for a computer system that may run the processes and be at least part of the systems as described herein, according to aspects of the present disclosure.

Referring to FIG. 5, a block diagram of a hardware data processing system is depicted in accordance with the present disclosure. Data processing system 500 may comprise a symmetric multiprocessor (SMP) system or other configuration including a plurality of processors 502 connected to system bus 504. Alternatively, a single processor 502 may be employed. Also connected to the system bus 504 is local memory, e.g., RAM 506 and/or ROM 508. An I/O bus bridge 510 interfaces the system bus 504 to an I/O bus 512. The I/O bus 512 is utilized to support one or more buses and corresponding devices, such as storage 514, removable media storage 516, input devices 518, output devices 520, network adapters 522, other devices, combinations thereof, etc. For instance, a network adapter 522 can be used to enable the data processing system 500 to communicate with other data processing systems or remote printers or storage devices through intervening private or public networks.

The memory 506, 508, storage 514, removable media storage 516, or combinations thereof can be used to store program code that is executed by the processor(s) 502 to implement any aspect of the present disclosure described and illustrated in the preceding figures.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer storage medium does not include propagating signals.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Network using an Network Service Provider).

Aspects of the present disclosure are described herein with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention. Aspects of the disclosure were chosen and described in order to best explain the principles of the invention and the practical application, and to enable others of ordinary skill in the art to understand the invention for various embodiments with various modifications as are suited to the particular use contemplated.

The invention claimed is:

1. A process for recommending items, the process comprising:
receiving a first input from a user via a user interface running on a computer;
modifying, via a processor on the computer, the user interface based on the first input;
receiving a second input from the user via the user interface running on the computer;
sending the first input and the second input to a server via a network;
using, at the server, the first input and the second input as data to run, at the server, through:
a set of primary models, where each primary model corresponds to an item; and
a set of secondary models, wherein each of the secondary models corresponds to one of the primary models, wherein the primary models are run, at the server, in parallel and the secondary models are run, at the server, in parallel with the primary models;
calculating, at the server, a confidence level for results of each primary model within the set of primary models, wherein the confidence level is based at least on the first input and the second input;
recommending the item where the confidence level of the primary model corresponding to the item is above a threshold and corresponds to a likelihood that another user that is similar to the user has the item that is presented to the user;
providing, for each recommended item, a parameter that is output from the secondary model corresponding to the primary model corresponding to the recommended item, wherein the parameter is based on the first input and the second input;
sending the recommended items and the parameters to the computer for display via the user interface;
continually training the primary models and the secondary models, at the server, based on data supplied by other users by:
periodically using the first input and the second input as data to run another pass through the primary models and the secondary models to determine an accuracy of the primary models and the secondary models, at the server;

not exposing the primary models from the server that do not pass the baseline for that model and the secondary models that do not pass the baseline for that model;

exposing, at the server, for access by the user via the computer, the primary models that pass the baseline for that model and the secondary models that pass the baseline for that model;

calculating, at the server, the confidence level for results of each primary model within the set of primary models for the other pass through the primary and secondary models; and recommending another item where the confidence level of the primary model corresponding to the item for the other run is above the threshold.

2. The process of claim 1, wherein the parameter is a range.

3. The process of claim 1 further comprising:

receiving a selection of the recommended items displayed at the computer; and generating, at the server, the selected one of the recommended items.

4. The process of claim 1, wherein:

recommending an item where an output value of the primary model corresponding to the item is above the predetermined threshold further comprises outputting to the user interface of the computer, a list of each item where an output value of the primary model corresponding to the item is above the predetermined threshold; and providing, for each recommended item, a parameter that is output from the secondary model corresponding to the primary model corresponding to the recommended item further comprises listing, via the interface of the computer, for each item in the list a corresponding cost range from the secondary models, where the cost range is customized for the user based upon the data input into the models.

5. The process of claim 1, wherein:

providing, for each recommended item, the parameter further comprises providing, for each recommended item, the parameter as a set of ranges via the user interface of the computer;

calculating the confidence level for results of each primary model within the set of primary models further comprises:

calculating, at the server, a set of confidence levels, where each confidence level of the set of confidence levels is based on a corresponding range of the parameter;

selecting, at the server, as the confidence level, a confidence level from the set of confidence levels that is closest to the threshold while being above the threshold.

6. The process of claim 1, wherein:

sending the user interface for display comprises outputting on the user interface of the computer, the first prompt to the user of the remote computer system, which requires the user to enter a first response about an activity characterizing the user's profession;

receiving a first input from a user via the user interface of the computer comprises receiving the first response as the first input;

modifying the user interface based on the first input comprises outputting on the user interface, a second prompt responsive to the entered first response, requiring the user to enter a second response that narrows at least one detail regarding the first response; and receiving a second input from the user via the user interface comprises receiving the second response as the second input;

further comprising:

outputting on the user interface of the computer, a third prompt responsive to the user of the remote computer system entering the second response, which requires the user to enter a third response characterizing historical information about the activity characterizing the user's profession;

outputting on the user interface of the computer, a fourth prompt, which requires the user to enter a fourth response characterizing financial information about the activity characterizing the user's profession;

outputting on the user interface of the computer, a fifth prompt, which requires the user to enter a fifth response characterizing resource information about resources allocated to the activity characterizing the user's profession; and outputting on the user interface of the computer, a sixth prompt responsive to the entered fifth response, requiring the user to enter a sixth response that narrows at least one detail regarding the fifth response characterizing the resource information about resources allocated to the activity characterizing the user's profession;

wherein:

using the first input and the second input as data further comprises using the first response, the second response, the third response, the fourth response, the fifth response, and the sixth response as data to run through the primary and secondary models.

7. The process of claim 6, wherein calculating the confidence level for results of each primary model within the set of primary models further comprising calculating, at the server, the confidence level based at least in part on the response, the second response, the third response, the fourth response, the fifth response, and the sixth response.

* * * * *